United States Patent [19]

Cockburn

[11] Patent Number: 5,055,658

[45] Date of Patent: Oct. 8, 1991

[54] SECURITY SYSTEM EMPLOYING DIGITIZED PERSONAL PHYSICAL CHARACTERISTICS

[76] Inventor: John B. Cockburn, 16A Bywater Street, London, SW3, Great Britain

[21] Appl. No.: 513,035

[22] Filed: Apr. 23, 1990

Related U.S. Application Data

[63] Continuation of Ser. No. 223,611, Jul. 25, 1988, abandoned.

[51] Int. Cl.[5] ........................ G06K 5/00; G06K 7/01

[52] U.S. Cl. .................................... 235/382; 235/375; 235/492; 382/4

[58] Field of Search ............ 235/375, 380, 382, 382.5, 235/492, 487; 340/825.31, 825.34; 902/3, 5, 25, 26; 382/2, 4

[56] References Cited

U.S. PATENT DOCUMENTS

| | | | |
|---|---|---|---|
| 3,383,657 | 5/1968 | Claassen et al. | 382/4 |
| 3,611,290 | 10/1971 | Luisi | 382/5 |
| 3,896,266 | 7/1975 | Waterbury | 902/3 |
| 4,053,710 | 10/1977 | Advani et al. | 381/42 |
| 4,095,739 | 6/1978 | Fox et al. | 235/382 |
| 4,109,237 | 8/1978 | Hill | 382/2 |
| 4,202,120 | 5/1980 | Engel | 382/4 |
| 4,338,025 | 7/1982 | Engel | 356/71 |
| 4,392,133 | 7/1983 | Lundgren | 340/825.31 |
| 4,393,366 | 7/1983 | Hill | 382/2 |
| 4,558,175 | 12/1985 | Genest et al. | 235/382 |
| 4,582,985 | 4/1986 | Löfberg | 382/4 |
| 4,620,318 | 10/1986 | Hill | 382/2 |
| 4,634,846 | 1/1987 | Harvey et al. | 235/375 |
| 4,783,823 | 11/1988 | Tasaki et al. | 382/2 |

OTHER PUBLICATIONS

Naik et al., "High Performance Speaker Verification . . . " ICASSP 86, Tokyo, CH2243-4/86/0000-0881, IEEE 1986, pp. 881-884.

"Voice Recognition and Speech Processing", Elektor Electronics, Sep. 1985, pp. 56-57.

Shinan et al., "The Effects of Voice Disguise . . . " ICASSP 86, Tokyo, CH2243-4/86/0000-0885, IEEE 1986, pp. 885-888.

*Primary Examiner*—Stuart S. Levy
*Assistant Examiner*—Robert Weinhardt
*Attorney, Agent, or Firm*—Thomas J. Greer, Jr.

[57] ABSTRACT

A security system including a security lock which can be programmed by the use of a master key to recognize specified slave keys. The system may include apparatus for digitizing a characteristic such as the thumb print, voice pattern, or retinal image of the holder of a slave key so that it is operable only by the key holder himself. The system is applicable inter alia to the protection of motor cars, the control of access to buildings and enclosures, and the restriction of operation of apparatus to authorized personnel.

5 Claims, 2 Drawing Sheets

SECURITY SYSTEM EMPLOYING DIGITIZED PERSONAL PHYSICAL CHARACTERISTICS

This application is a continuation, of application Ser. No. 07/223,611, filed July 25, 1988, now abandoned.

The present invention relates to security systems. It is an object of the invention to provide a security system of high security.

A security system according to the present invention comprises a security device, a master key, and one or more slave keys, the security device being programmable by use of the master key to respond to and only to, selected slave keys in combination with a coded representation of some personal characteristic of the slave key holder, for example, his thumb print, the pattern of his retinal blood-vessels, or his voice.

The master key and/or the slave keys may be in the form of a plastic card of similar type to a credit card, which may have a magnetic stripe carrying coded information, or may have computing or data storage means actually incorporated in the card. In one form of the invention the master key is of this type, but the slave key is a mechanical key having an enlarged portion containing means for detecting and digitising the print of a thumb grasping the key, and provided on its blade with electrical contacts whereby the digitized information may be passed to computing circuits within the security device. In other forms of the invention the slave keys are plastic cards as described above, but the key holder speaks into a microphone and the frequency spectrom of his voice is analysed and digitally coded, or he may be required to look into an eyepiece, adjust his position until targets visible through the eyepiece are in alignment, and then, for example by pressing a button, cause his retinal image to be recorded and digitised. In any of these forms of the invention additional security may be achieved by requiring the keyholder to supply in addition, a personal identification number.

The invention will now be further described with reference to the accompanying drawings, in which.

Figure 1:
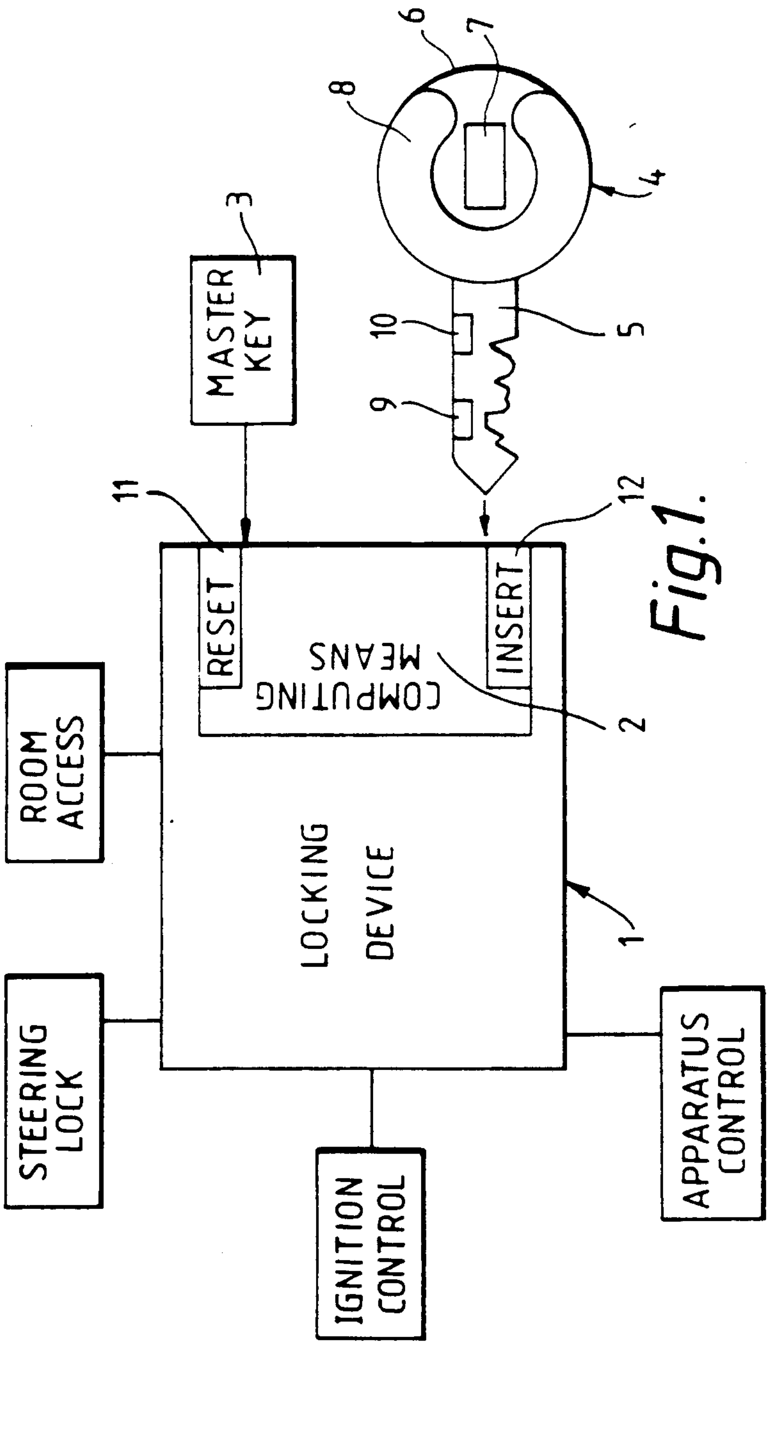
FIG. 1 shows diagrammatically the essential components of a system according to the invention, relying on thumb-print identification, and suitable for use in locking the storing and ignition systems of a motor car.

Referring first to FIG. 1, the system comprises a locking device 1 which incorporates the steering lock and ignition switch of a motor car to be protected by the system, and if the car is equipped with a centralised locking system, also incorporates the door and boot locks. The locking device includes computing means 2, the function of which will be more fully described below.

When the car is sent from the factory to a dealer it is accompanied by a master key 3 in the form of a plastic card containing recorded information which cooperates with the computing means 2 in the locking device to enable it to carry out a programming operation. This master key is sent with the car in a sealed container, to be opened only by the purchaser of the car. With the car there are also supplied a number of slave keys 4 whose construction will be described more fully below. The locking device has a slot to receive the master key and a keyhole for the insertion of a slave key.

When the car is sent from the factory the computing means is pre-programmed to respond to a slave key of a kind which is supplied to garages and distributors to enable them to service and transport the car as required.

The slave key as supplied to the purchaser of the car is of a more elaborate form, as shown in the figure. It resembles a conventional key, having a blade 5 and a stock or handle portion 6. This is provided with a window 7 over which the thumb of the key holder will be pressed in use, being located by a ridge 8 round the rim of the handle. The window 7 contains electronic means for digitising the pattern of ridges on the surface of the holder's thumb, and electrical contacts 9, 10 provided in the blade 5 of the key allow the digital data produced in this way to be passed to the computing means in the locking device.

When the car is delivered to the purchaser he breaks open the package containing the master key 3 and inserts the master key in the slot provided in the locking device. He then presses a reset button 11 provided in the locking device, causing any programme already set into the computing means to be deleted. He then inserts his slave key 4 with his thumb pressed over the window 7, and, by pressing an insert button 12 provided in the locking device causes the computing means to program itself to recognise this slave key in combination with his own thumb print. By the insertion of another slave key and a further pressure of the insert button 12, the computing means of locking device may be programmed to recognise the key and thumb print of other persons whom he wishes to authorise to drive the car. Finally, he removes the master key, without which the computing means cannot further be programmed, or the programs deleted. Conventional electrical coupling means connects the computing means to the master key slot and to the slave key keyhole, so that the information carried by keys 3 and 4 is transferred to the computing means. The locked/unlocked mode of the locking device is changed only when the computing means recognizes a pre-programmed digitized personal characteristic, to thereby actuate the locking device, for example, to unlock a door.

By this means the car is programmed, so to speak, to recognise the thumb prints of only those persons who are authorised to drive it, and to reject attempts to enter or to start the car by any other person.

In a modification, the system is arranged to delete the initial programme set into the locking device automatically on first insertion of the master key, irrespective of whether or not the reset button is pressed. This ensures that the owner does not inadvertently leave the car accessible to anyone with a garage slave key.

Although the key is shown in the drawing as being similar to the conventional type of key used with cylinder locks, it need not be of key shape at all. It could be a plastic card incorporating a chip carrying the digitising means, or a plug-in device of any suitable shape.

When ownership of the car is transferred, the master key is transferred with the car, and the new owner inserts it, presses the reset button to delete any previous programs contained within the computing means and re-programmes it as necessary for his own purposes.

In an alternative arrangement the slave key is also in the form of a plastic card and a single slot is provided in the locking device. Insertion, followed by removal, of the master key sets the locking device into its programming mode, and the slave keys can then be inserted, whereupon the locking device will be programmed to recognise them. A further insertion and removal of the master key closes the programming mode, and restores the device to its normal locking mode. While in the programming mode, it may be arranged that insertion of a slave key without a thumb on the digitising means will cancel that slave key from the program.

In a simplified and less expensive version, only one thumb print digitiser is used, and this is placed on the dash board of the car. The key may be a normal type of key, or of the credit card type, but in this case the thumb print check is not available against the opening of the external doors of the car, but only against unauthorised starting of the car since the digitiser is not accessible until the user has entered the car.

The above description relates to the protection of motor cars, but the system is of much more general application. It may be used for example, for controlling entry to hotel rooms or access to sensitive areas such as bank strongrooms or computer rooms containing confidential information, to domestic or office premises, to boats and caravans and the like. Furthermore, it may be used for controlling the operation of cash dispensers and other computer terminal devices, switch gear and machinery and anything else which needs to be protected from unauthorised interference.

Figure 2:
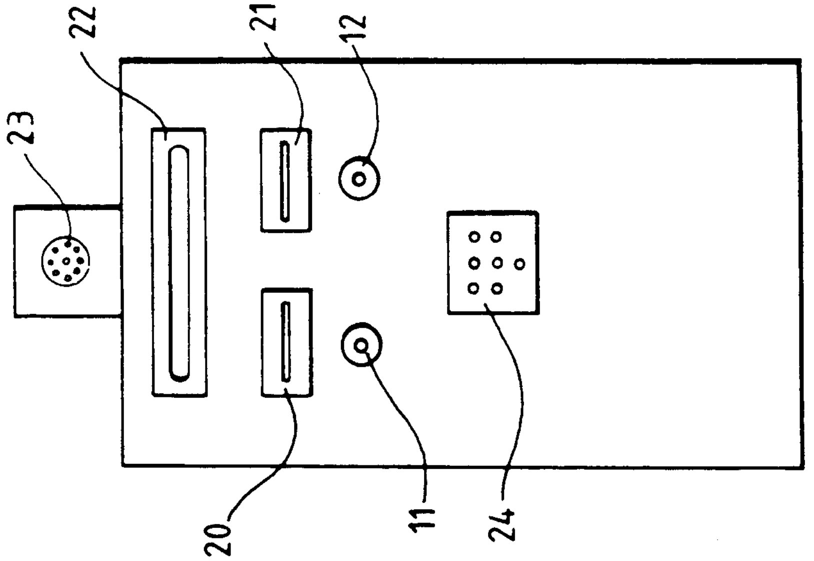
FIG. 2 shows diagrammatically the console of an access control system utilising voice recognition.

FIG. 2 illustrates diagrammatically an embodiment of the invention suitable for controlling access to premises or for restricting the operation of apparatus to authorised personnel.

This embodiment makes use of identification of the key holder by means of a voice recognition system. Such systems have been extensively described in the literature and by way of example reference may be made to the paper "High performance speaker verification using principal spectral components" by J. M. Naik and G. R. Doddington in Proceedings of the IEEE International Conference on Acoustics, Speech and Signal Processing, Tokyo, 1986, page 881-884.

FIG. 2 is a greatly simplified view of the console of apparatus for carrying out this embodiment of the invention. The master and slave keys employed are both in the form of plastic cards which may be coded with a magnetic stripe or may incorporate a storage chip. Two card readers are provided, the first of them, 20, for the master key and the other 21, for the slave keys. A reset button 11 and an insert button 12 allow for programming, as described with reference to the embodiment of FIG. 1, and the console is further provided with a display device 22 and a microphone 23.

In normal operation the key holder inserts his slave key into the reader 21, whereupon the display 22 presents a number of digits or syllables which the key holder then pronounces into the microphone 23. The computer circuits provided in the console analyse the sounds so recorded by means of a suitable algorithm, such, for example, as that in the above-mentioned paper, to obtain a set of parameters, which are then compared with stored information previously programmed into the computer memory. Since the computer is concerned, not with interpreting the received sounds, but with processing them to identify the speaker, a limited number of syllables or digits are chosen to be displayed and spoken but they are arranged to be presented at the display device 22 in random order so as to ensure that the device cannot be operated by means of a recording of the voice of a properly authorised key holder.

Optionally, a key pad 24 may be provided so that the key holder may also be required to key in a personal identification number in known manner. Such a key pad is also applicable to the other embodiments of the invention described herein.

In order to program the system, the master key is inserted into the card reader 20 and the reset button 11 is pressed, thereupon clearing all stored slave key information from the computer memory of the system. A slave key is then inserted into the card reader 21 and the insert button 12 is pressed and held down while the key holder speaks into the microphone 23, pronouncing whatever digits or syllables are displayed on the display 22. The computer system may require him to repeat each a number of times so that each can be digitised and the results averaged. When the process has been completed the insert key is released and the slave key card is ejected. A number of slave keys can be recorded in this manner, after which the master card is recovered, which may be arranged for example, to occur on pressing the insert button 12 when no slave card has been inserted into the reader 21.

Figure 3:
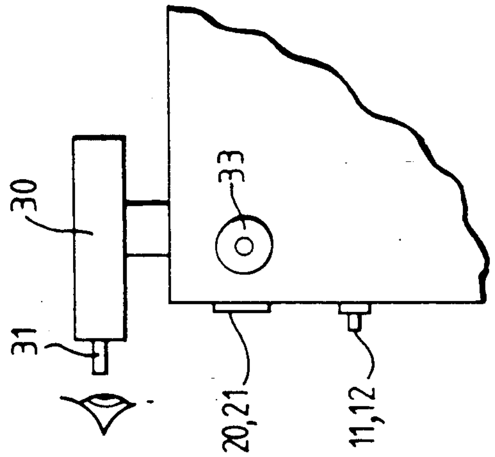
FIG. 3 is indicative of a modification of the arrangement of FIG. 2 making use of retinal pattern recognition.

FIG. 3 is a fragmentary side view of the console of a modified form of the security system described with reference to FIG. 2, in which identification of the slave key holder depends not on voice recognition but on recognition of the pattern of his optical fundus.

In this embodiment, the display 22 and microphone 23 are replaced by an optical system 30 having an eyepiece 31. The system is provided with master and slave card readers 20, 21 and with reset and insert buttons 11, 12 as described with reference to FIG. 2 and with an additional record button 33.

In use of this apparatus, the slave card holder inserts his card into the card reader 21 and looks into the eyepiece 31 of the optical system 30. The eyepiece presents two or more target images to the view of the key holder and by moving his head slightly and adjusting the distance of his eye from the eyepiece, these images can be caused to coincide. When this occurs the key holder presses the record button 33 and the image of his retina is recorded within the optical system 30. This image is then digitised, and the resulting digits are compared with stored data representing the fundus images of authorised key holders.

Programming of this variant is entirely analogous to that described with reference to FIG. 2, using the master key and the reset and insert buttons, except, of course, that instead of speaking into the microphone when the system is to be programmed to accept a slave key the key holder presents his eye to the eyepiece 31 as already described.

It will be noted that locking and unlocking is performed only by the slave keys. The master key does not lock or unlock any physical device, but merely opens or closes the programming facility of the locking device which enables it to recognise the appropriate slave key, together with an associated physical characteristic, and optionally, also with a personal identification number.

In certain applications it will be necessary for some or all of the slave keys to be recognisable by two or more locking devices. For example, in a hotel a guest will need access only to his own room, but cleaning staff will need access to all the rooms which they service. The present invention can provide for this without difficulty.

The system may have its own power supply within the security device, or if it is dependent on an external supply, it may be provided with stand-by batteries in a known manner.

I claim:

1. A security system comprising a locking device having computing means, a master key containing recorded information, a slot in said locking device for receiving the master key, said slot connected to said computing means and said master key carrying means for passing said recorded information through said connection from the slot to the computing means, a slave key, a keyhole in said locking device for receiving the slave key, said keyhole connected to said computing means, said computing means responsive to said recorded information carried by said master key to program said computing means to respond to, and only to, a digitized representation of a personal characteristic of an individual received from said slave key for actuating said locking device, said digitized personal characteristic being carried by said slave key, said slave key carrying means for digitizing and storing said personal characteristic and also carrying electrical contacts for passing said personal characteristic digital data through said connection from the keyhole to the computing means, said computing means responding to the identity of said digitized personal characteristic data received from said slave key with said information received from said master key to actuate the locking device.

2. A security system according to claim 1, in which the personal characteristic is a thumb print.

3. A security system according to claim 1 wherein said locking device is coupled to and controls the operation of the steering system of a motor car.

4. A security system according to claim 1 wherein said computing means is pre-programmed to recognize digitized personal characteristics received from a first said slave key and wherein said program of digitized personal characteristics of said first slave key is automatically deleted and said computing means is enabled to be programmed to recognize digital personal characteristics received from a second said slave key on the initial insertions of the master key.

5. A security system according to claim 1 wherein said locking device is coupled to and controls the ignition system of a motor car.

* * * * *